Figure 1:
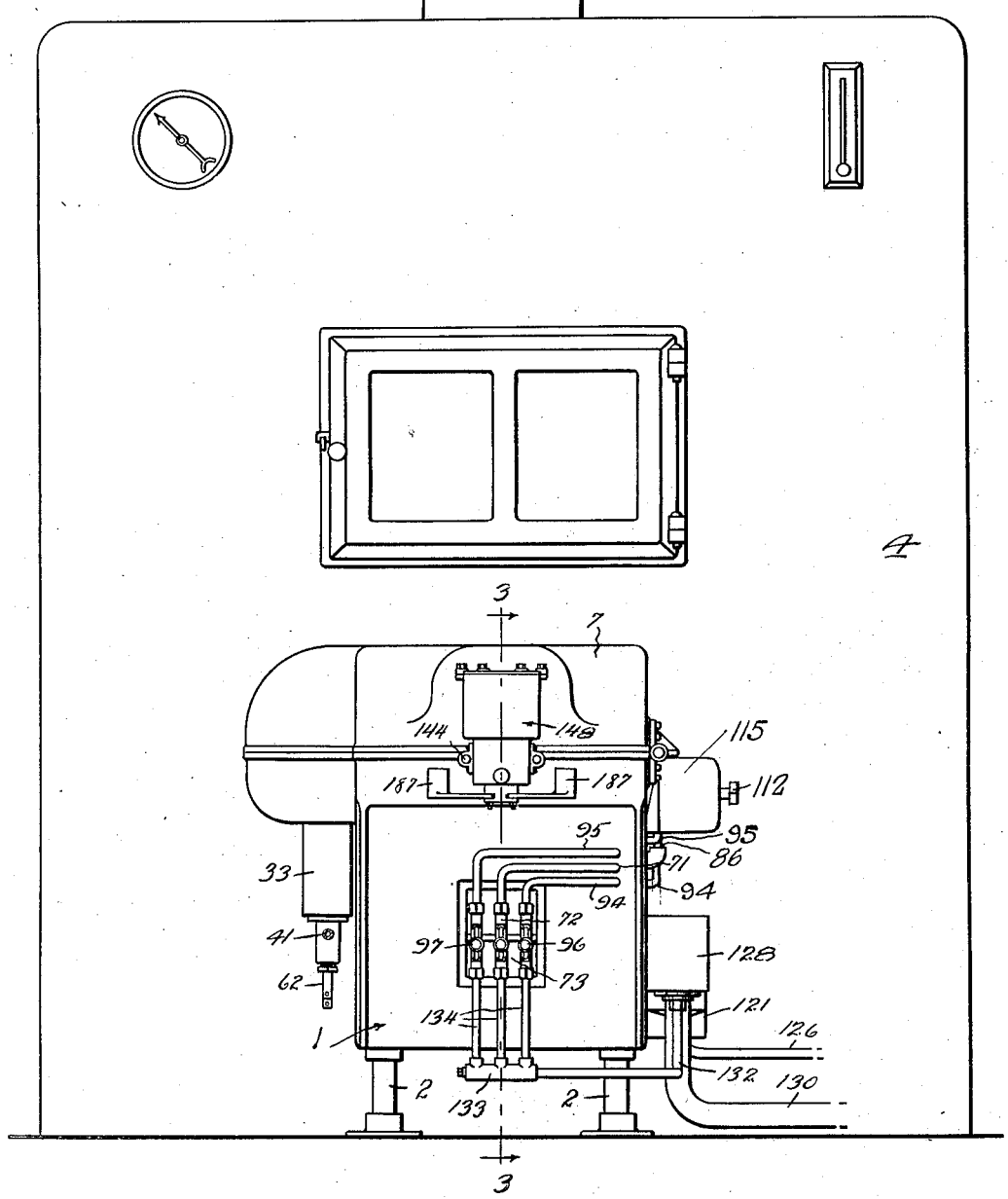

Oct. 23, 1928.  
M. RESEK  
1,688,658  
HEATING SYSTEM  
Filed April 18, 1925  
11 Sheets-Sheet 1

Inventor  
Marc Resek  
By Hull, Brock & West  
Attys.

Oct. 23, 1928.

M. RESEK 1,688,658

HEATING SYSTEM

Filed April 18, 1925 11 Sheets-Sheet 2

Oct. 23, 1928.

M. RESEK 1,688,658

HEATING SYSTEM

Filed April 18, 1925     11 Sheets-Sheet 3

Inventor
Marc Resek
By Hull, Brock & West
Attys.

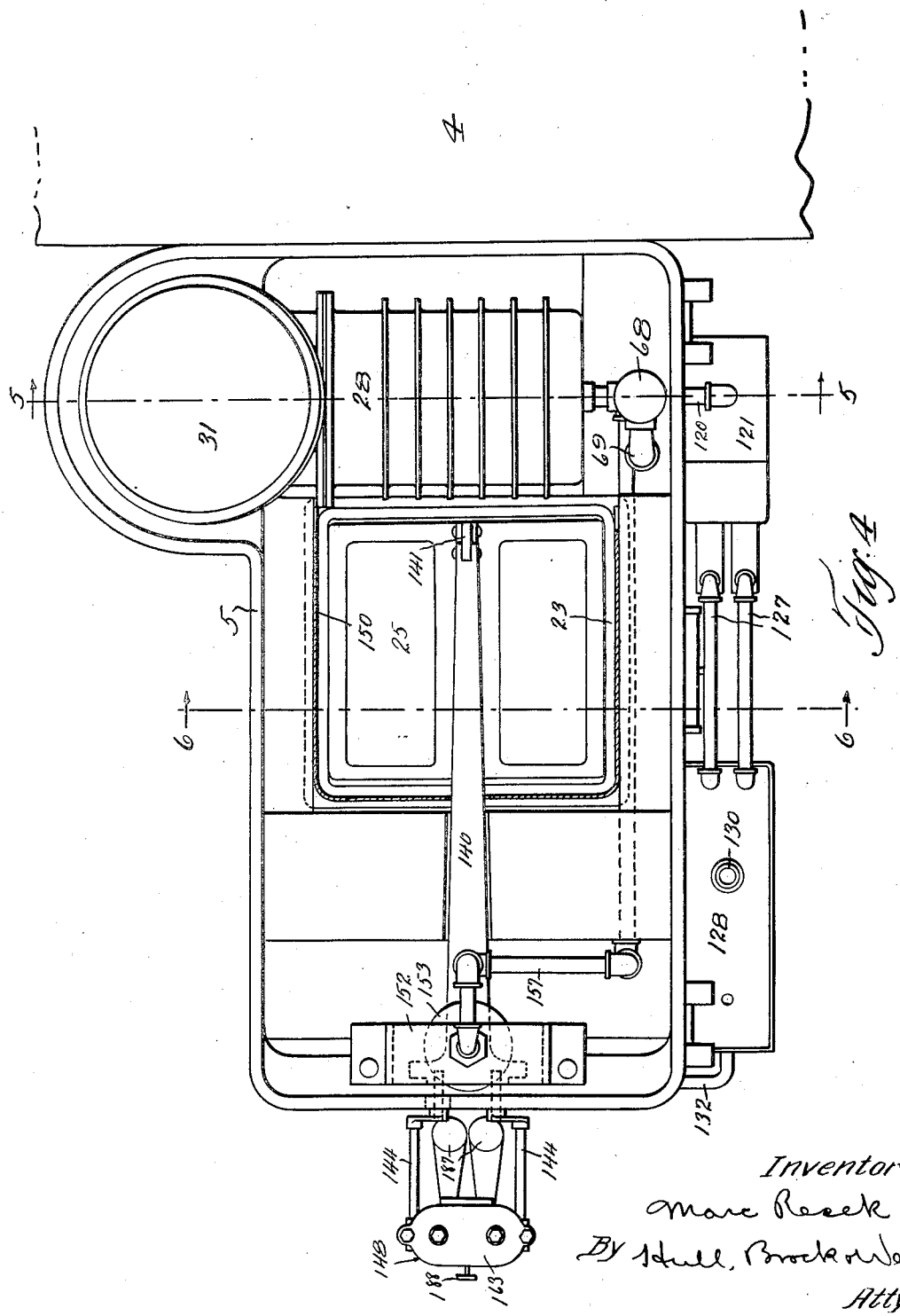

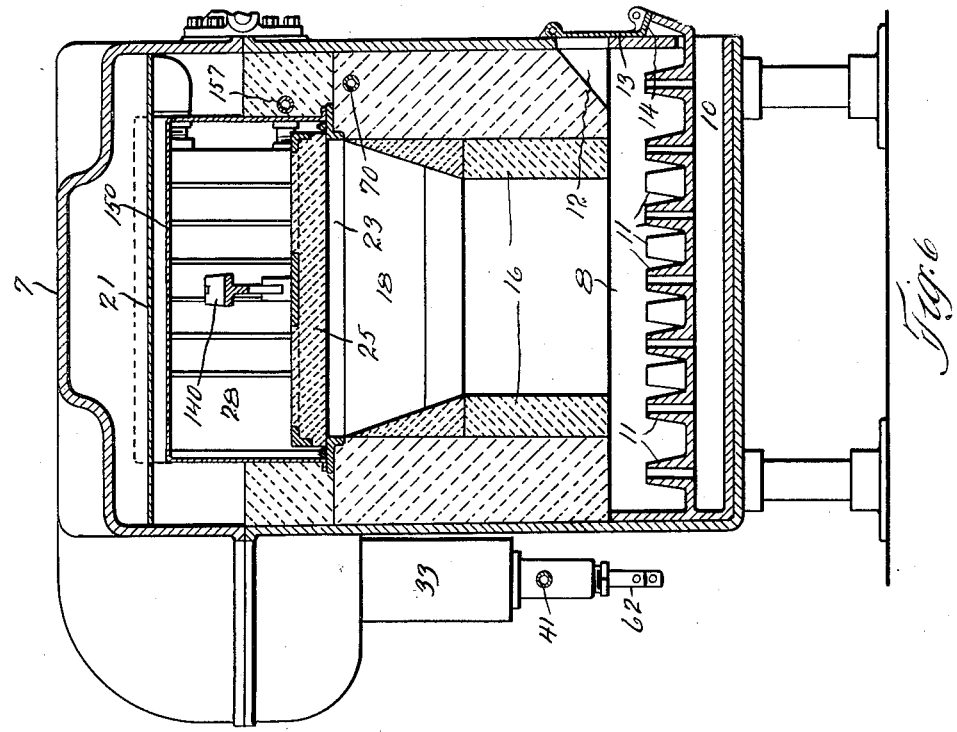
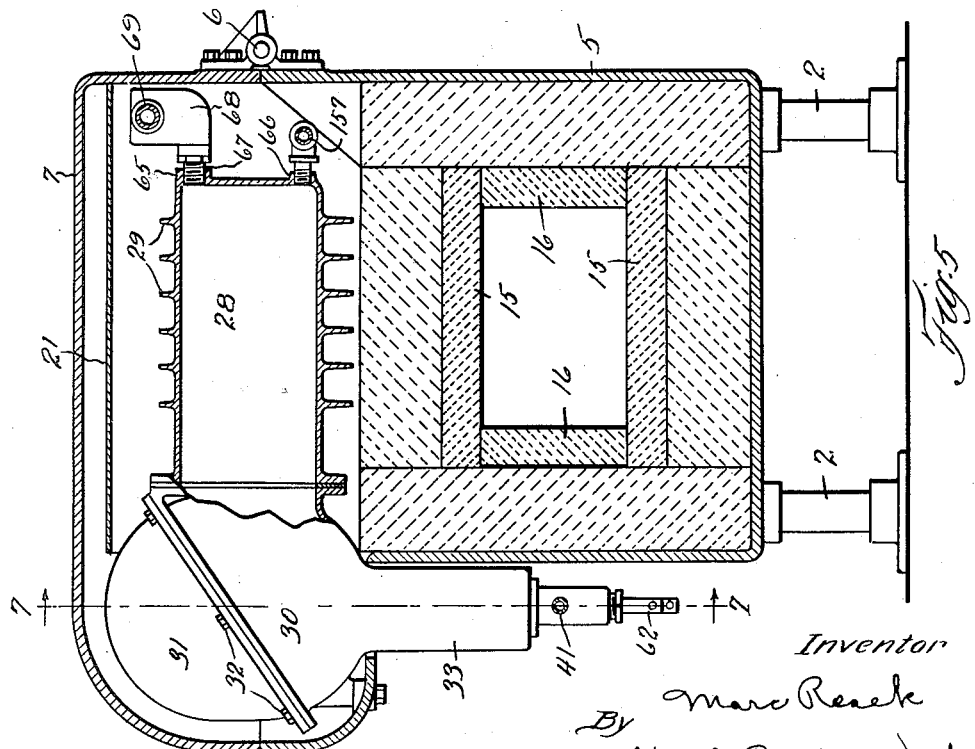

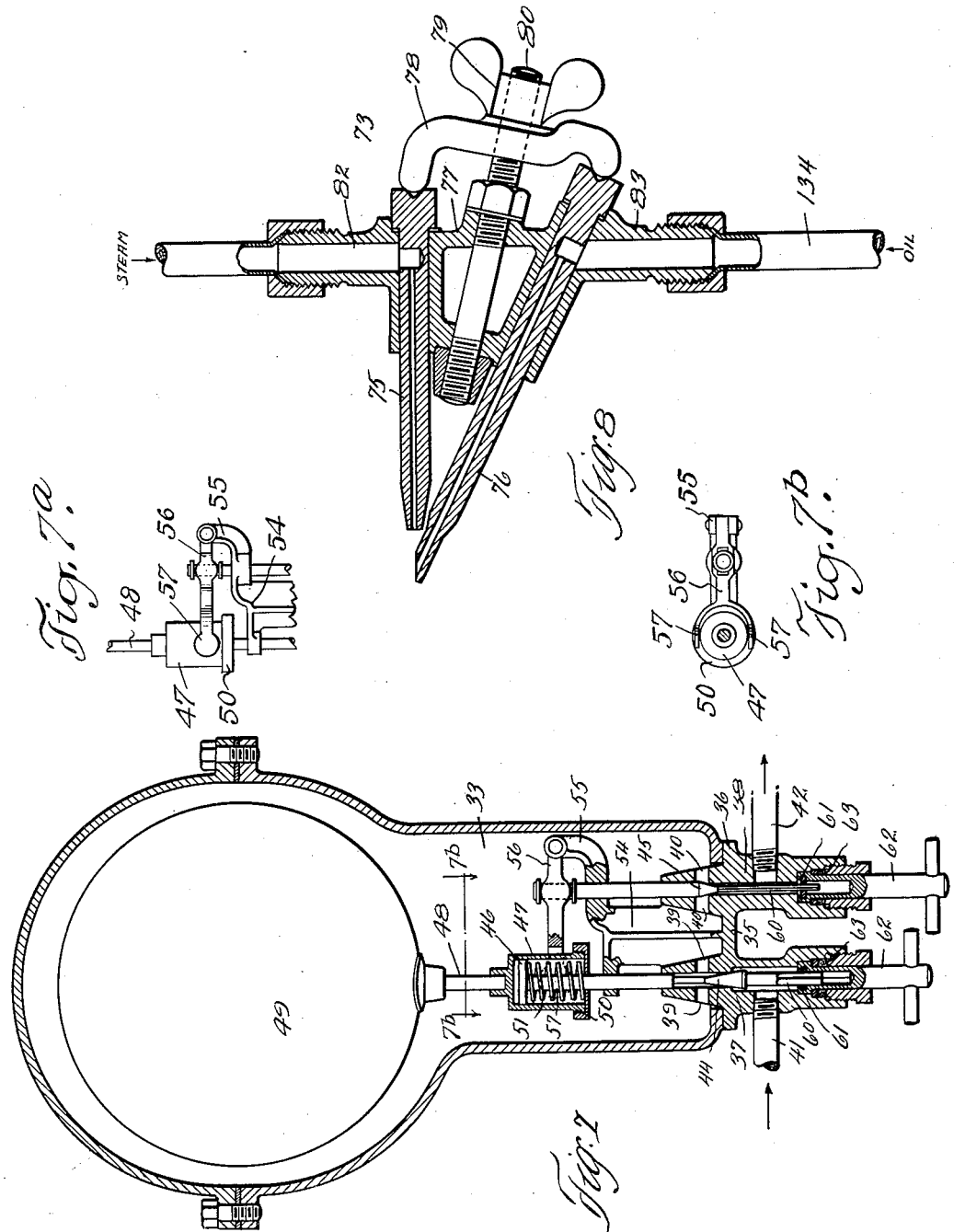

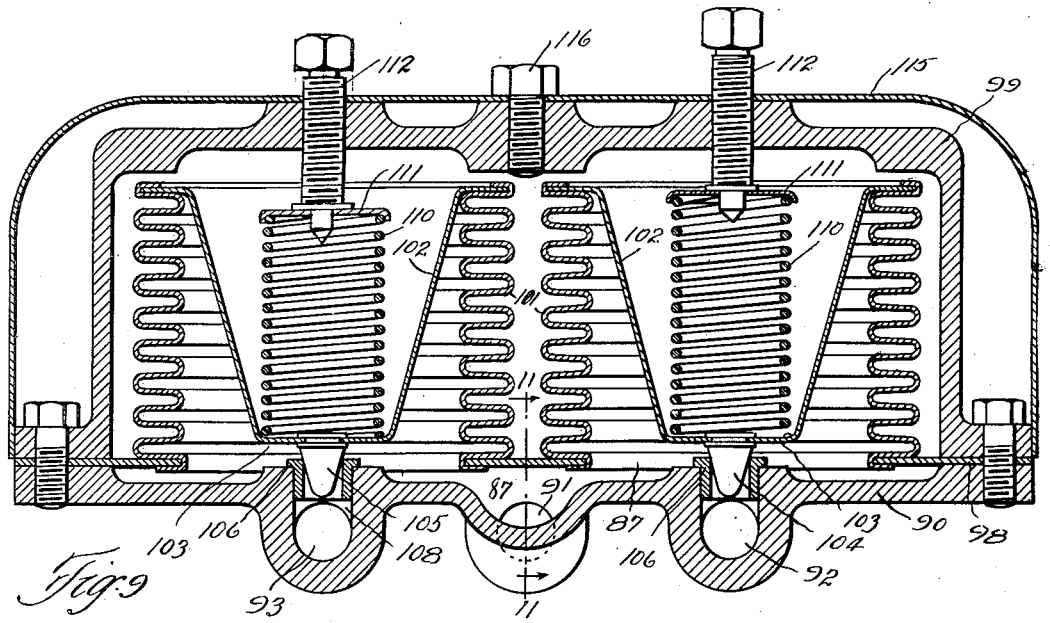
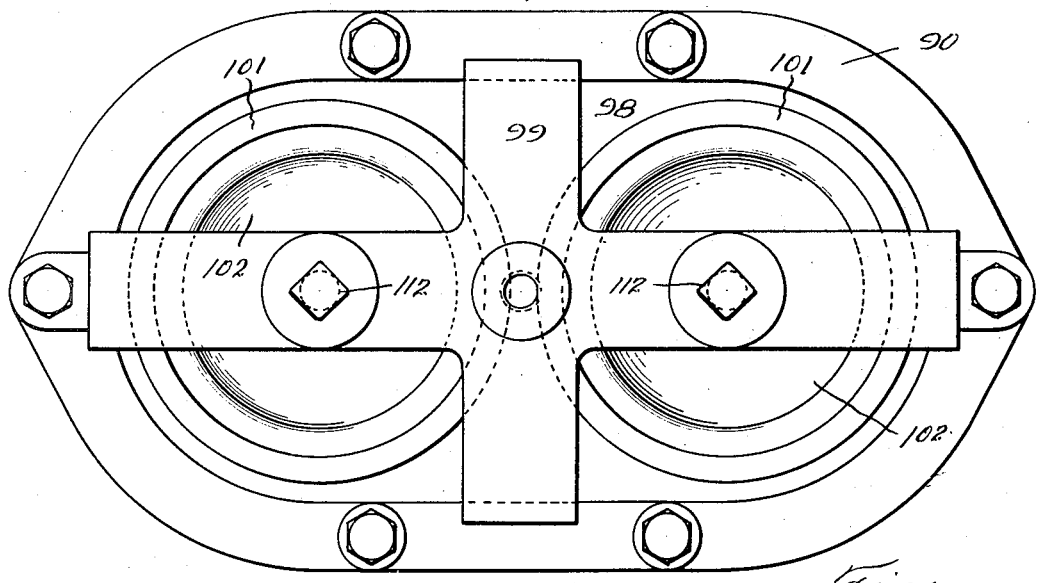
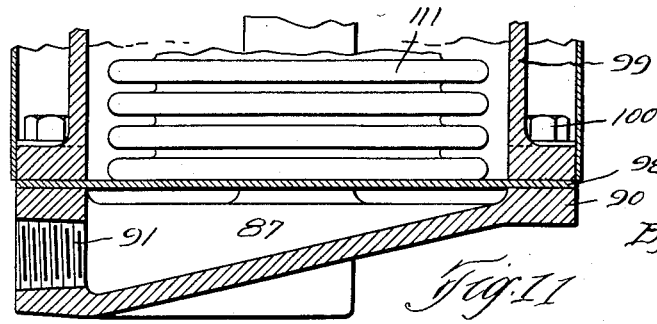

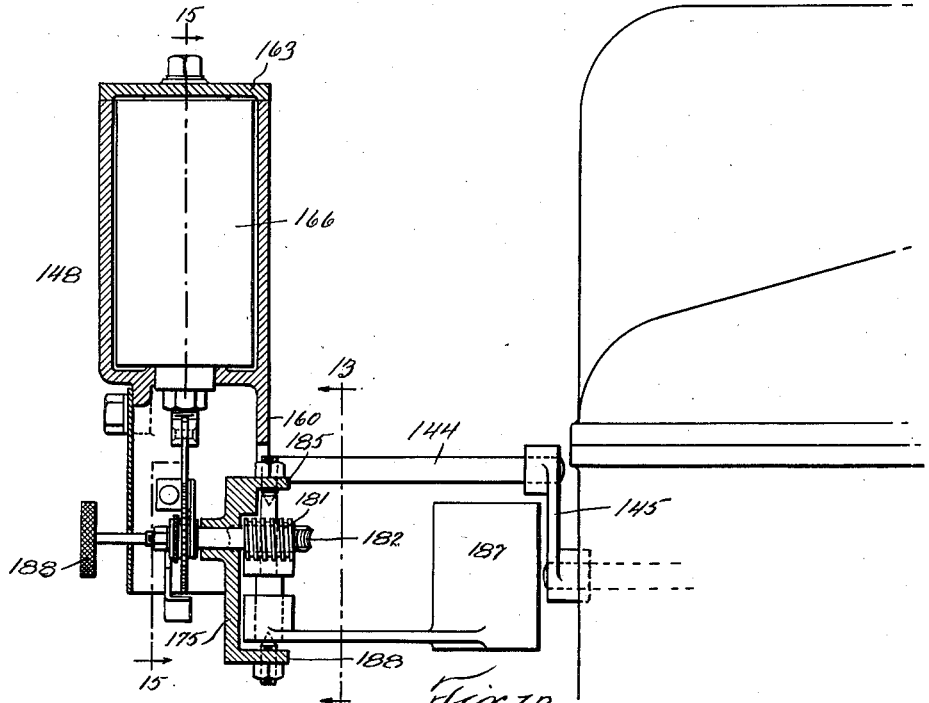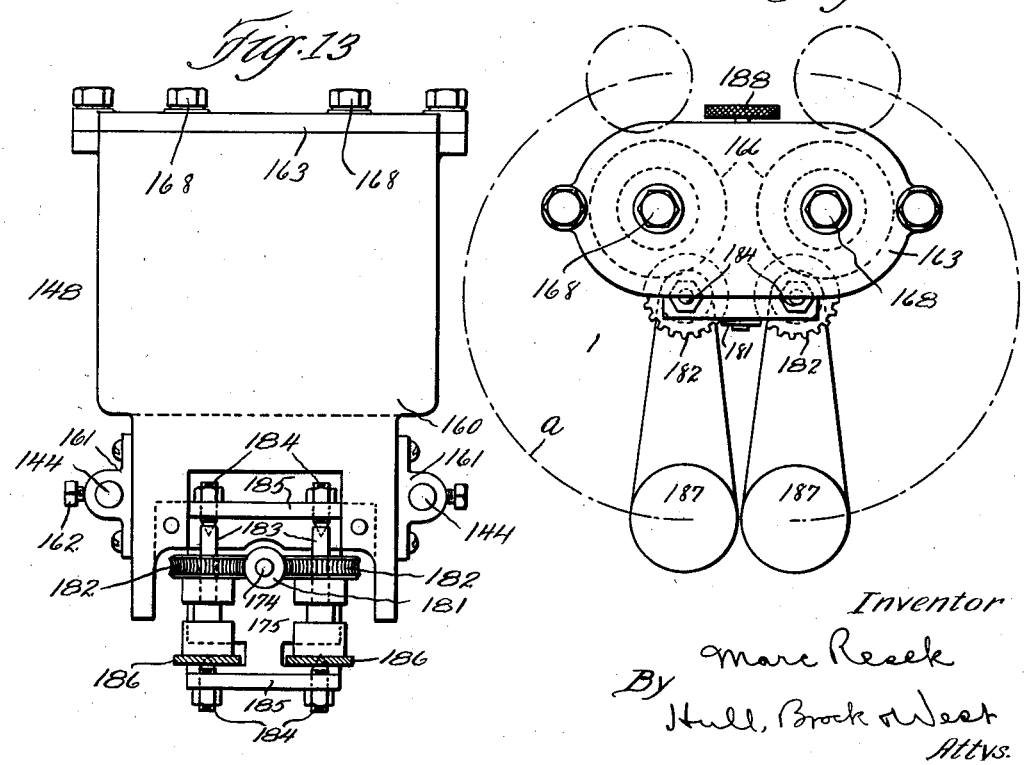

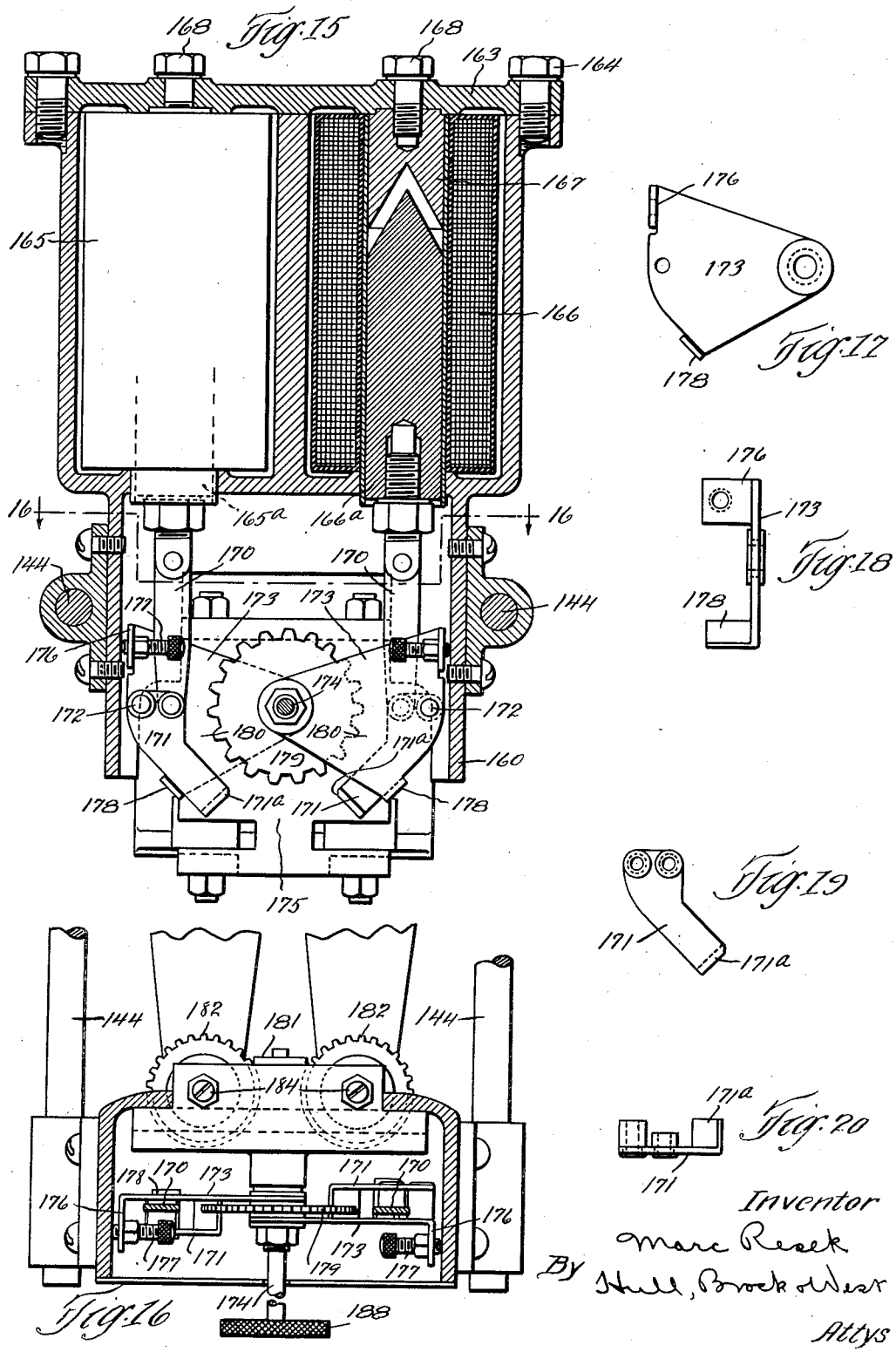

Oct. 23, 1928. 1,688,658
M. RESEK
HEATING SYSTEM
Filed April 18, 1925 11 Sheets-Sheet 10
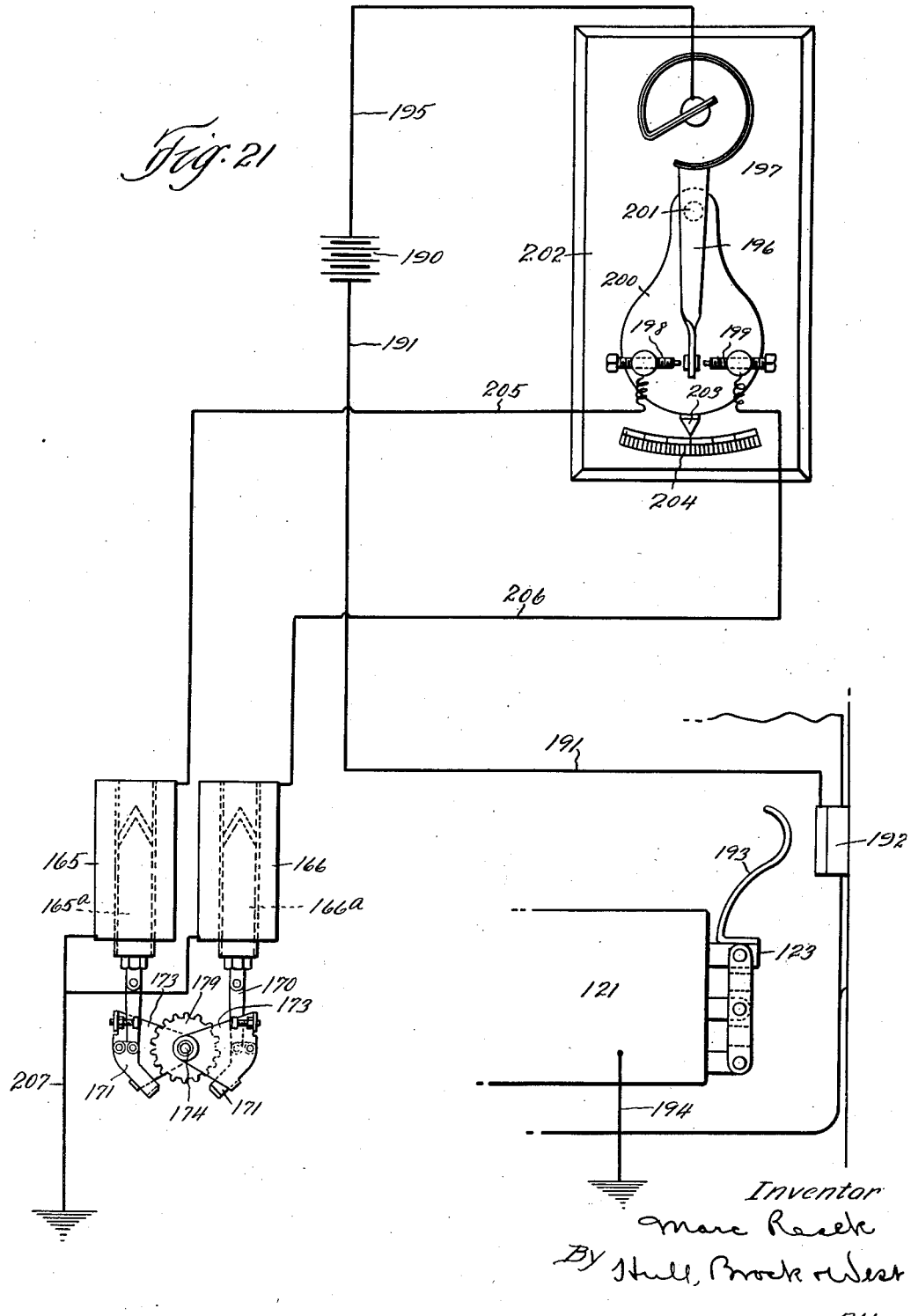

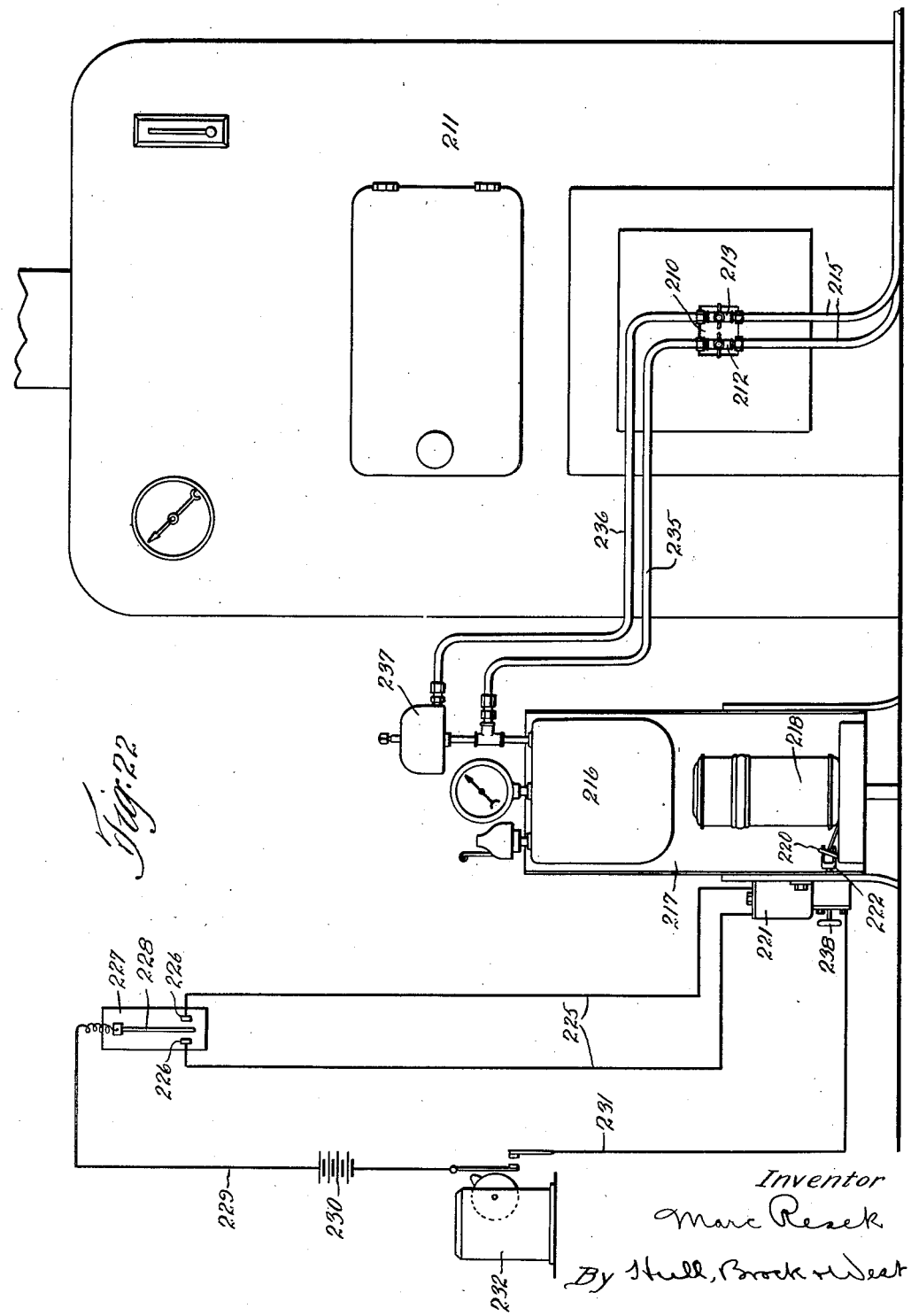

Patented Oct. 23, 1928.

1,688,658

UNITED STATES PATENT OFFICE.

MARC RESEK, OF CLEVELAND HEIGHTS, OHIO, ASSIGNOR TO PERFECTION STOVE COMPANY, OF CLEVELAND, OHIO, A CORPORATION OF OHIO.

HEATING SYSTEM.

Application filed April 18, 1925. Serial No. 24,052.

On July 18, 1924, I, jointly with Lee S. Chadwick and J. Alger Dahlstrom, filed an application for fuel oil burning apparatus, the same bearing Serial No. 726,657.

My present invention relates to a heating system involving a burner of the nature of that disclosed and claimed in the above mentioned application. While this system is peculiarly suited to house heating purposes, it is applicable to practically all situations where it is desirable or important to maintain a given temperature or range of temperature.

The invention has to do also with a thermostatically governed electrical control means, the same being especially adapted to the heating system herein disclosed.

Again, the invention pertains to improvements which render the burner better suited to the purpose at hand.

The fundamental object of the invention is the provision of a heating system involving a fuel oil burner and whereby a substantially uniform temperature is effectually and automatically maintained in an apartment or other space or enclosure heated by the burner regardless of changes in outside or atmospheric temperature.

Another object of the invention is the provision of a heating system of the character above set forth incorporating a heating device or burner having a plurality of sections, said sections being automatically thrown into or out of operation successively accordingly as the demand for heat increases or decreases, each section being adjusted throughout its range of operation from low to high heat before the next succeeding section is thrown into operation.

Another object is the provision of a plurality of atomized liquid fuel burners operated by steam that is generated by the heat of the flame or flames thereof, steam pressure operated means for throwing the burners into operation successively as the steam pressure increases, means for varying the amount of heat allotted to the generation of steam, a steam pressure operated device for governing the last mentioned means to cause said amount of heat to be reduced as the steam pressure rises above a pre-determined value, and thermostatically controlled mechanism for resisting the action of the steam pressure operated device.

A still further object comprehended by the present invention is the provision of a plurality of pressure fluid operated liquid fuel atomizing burners to the successive ones of which the delivery of the operating fluid is governed by the pressure of said fluid.

Other objects of the invention are: to provide, in combination with an atomizing oil burner operated by steam generated by the heat of its flame and involving means for varying the amount of heat allotted to the generation of steam, a thermostatically controlled mechanism for governing said means; to provide in the apparatus just described a steam operated device for actuating said means to reduce the amount of heat directed to steam generation as the steam pressure rises above a predetermined value, and a thermostatically controlled mechanism for resisting the action of the steam operated device; to provide, in apparatus of the foregoing character, a damper for intercepting the passage of heat from the flame to the steam generator, and a thermostatically controlled mechanism for governing the operation of the damper; to provide, in said apparatus, a steam pressure operated device for moving the damper to deflect the heat from the steam generator as the steam pressure in the generator rises above a predetermined value, and a thermostatically controlled mechanism for resisting the action of the steam operated device; to provide, in apparatus of the foregoing nature, a weight for counterbalancing the damper and acting in opposition to the steam pressure operated device, and thermostatically controlled mechanism for shifting the center of gravity of the weight; and to provide, in combination with said thermostatically controlled mechanism, manual means for accomplishing the same purpose. The advantages of the manual adjustment of the weight will hereinafter appear.

Still further objects of the invention are the provision of electrical means for moving an element, means intermittently and momentarily closing the circuit which energizes said means, and a thermostatic switch for closing the circuit when the temperature rises and falls beyond predetermined values; and, more specifically, the provision of electrical means for moving an element in two directions and comprising a branched electric circuit, each branch including electromagnetic means for moving said element in one of the two directions, a switch in the circuit, with mechanism for intermittently and momentarily closing it, and thermostatic means for selecting the branch through which the current is to be directed.

The foregoing objects, with others hereinafter appearing, are attained in the embodiments of the invention illustrated in the accompanying drawings wherein similar reference characters designate corresponding parts throughout the several views.

Figure 2:
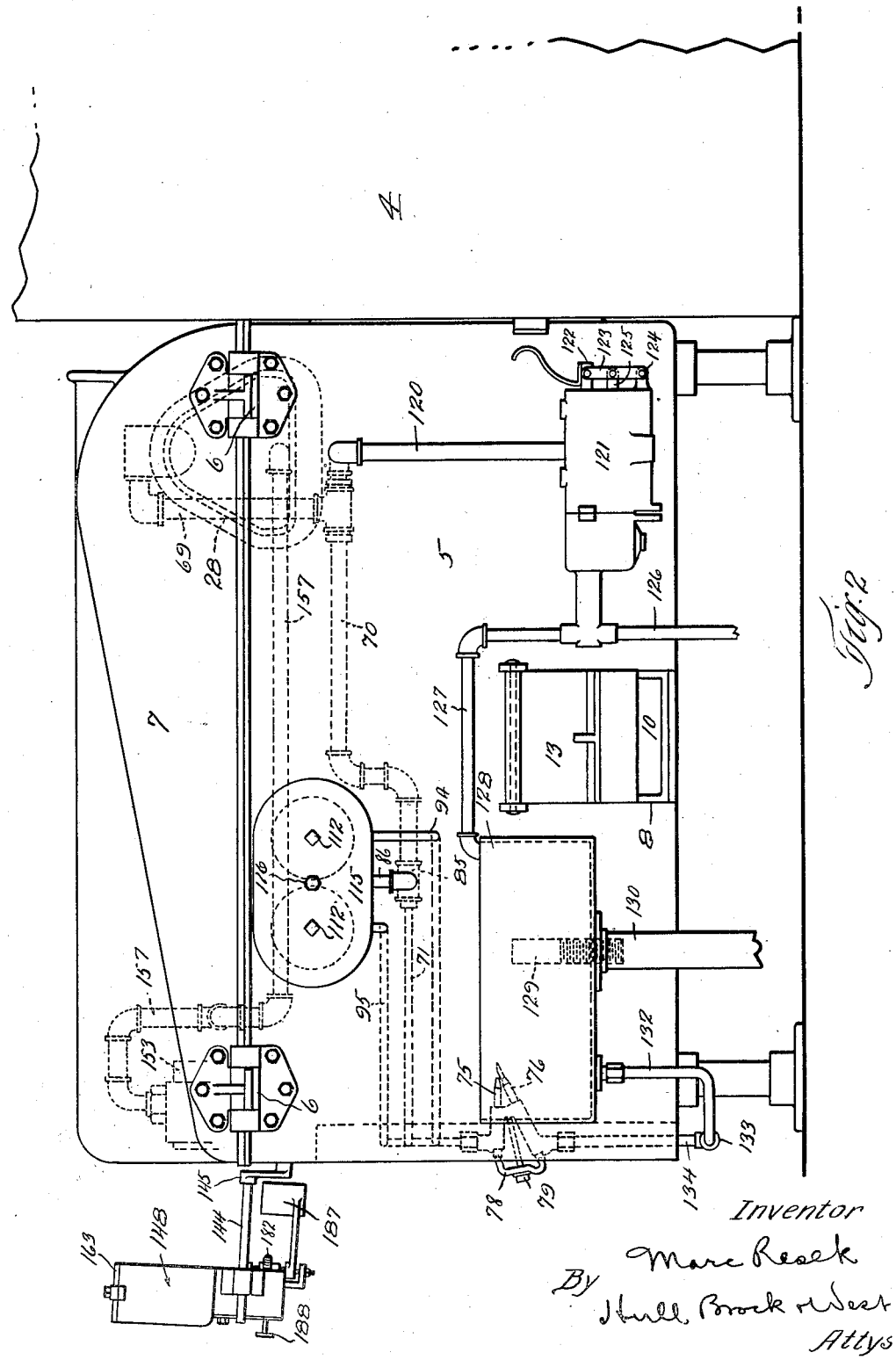
Figure 3:
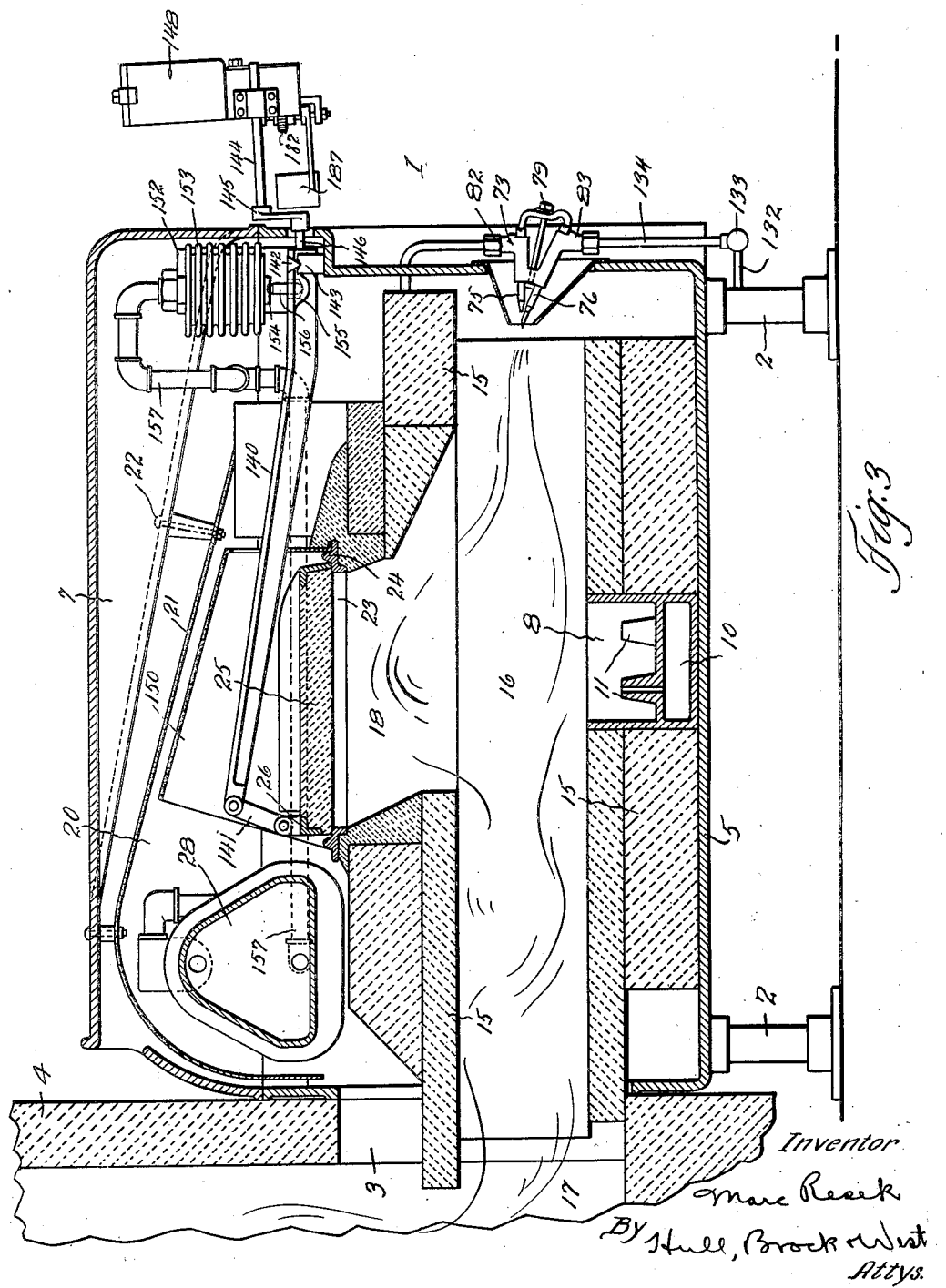

In the drawings, Fig. 1 is a general view, showing in front elevation a standard type of furnace in operative relation to which is situated the fuel oil burning apparatus of my invention; Fig. 2 is a right hand side elevation of the apparatus on a scale considerably enlarged over that of Fig. 1; Fig. 3 is a central vertical section through the apparatus on the line 3—3 of Fig. 1; Fig. 4 is a plan view of the apparatus with the cover removed; Figs. 5 and 6 are sections on the respective lines 5—5 and 6—6 of Fig. 4; Fig. 7 is an enlarged vertical section through the float chamber of the apparatus, the plane of section being indicated by the line 7—7 of Fig. 5; Fig. 7ª is an elevational detail of the float operating mechanism of Fig. 7; Fig. 7ᵇ is a sectional plan on the line 7ᵇ—7ᵇ of Fig. 7; Fig. 8 is a sectional detail of the burner on a further enlarged scale; Fig. 9 is a longitudinal sectional view, and Fig. 10 a plan view with the cover removed, of steam operated valve mechanism for controlling the auxiliary burners; Fig. 11 is a sectional detail on the correspondingly numbered line of Fig. 9; Fig. 12 is a sectional rear elevation of the weight mechanism which controls the damper of the fuel oil burning apparatus; Fig. 13 is a sectional rear elevation of the weight mechanism, the plane of section being designed by the line 13—13 of Fig. 12; Fig. 14 is a plan view of the weight mechanism; Fig. 15 is an enlarged sectional detail on the correspondingly numbered line of Fig. 12; Fig. 16 is a section substantially on the line 16—16 of Fig. 15; Figs. 17 and 18 are elevational views, at right angles to each other, of one of the pawl carrying plates of the weight mechanism; Fig. 19 is a side elevational view and Fig. 20 a plan view of one of the pawls of the weight mechanism; Fig. 21 is a wiring diagram of the electric circuit which controls the weight mechanism; and Fig. 22 shows an installation of a modified form of the invention.

The fuel oil burning apparatus, designated generally by the reference numeral 1, is supported upon legs 2 in front of the ash-pit door opening 3 of a furnace 4. This furnace may be of the steam boiler, hot water, or hot air class, and furthermore it is to be understood that my invention is applicable to other purposes than to the operation of heating plants of the classes mentioned.

The apparatus comprises a metallic box-like casing 5 to one side of which is hinged, as at 6, a cover 7. Disposed transversely of the bottom portion of the casing 5 is a preheating burner 8, the same being shown as in the nature of a basin into which a quantity of liquid fuel may be introduced through a filling spout 9 (Fig. 6) air to support combustion being admitted through a passageway 10 and a series of tubular bosses 11 which project above the surface of the oil. An opening 12 in the side of the structure gives access to the burner for lighting, and this opening is normally closed by a door 13 having an extension 14 for covering the filling spout 9. Where gas is available, a gas preheating burner may be substituted for the one above described.

The lower portion of the casing 5 is lined with suitable refractory material 15 which encloses a combustion chamber 16 that communicates at its rear end with the interior of the furnace. A passageway 18 opens through the roof of the combustion chamber into a compartment 20, the top of which is formed by a shell 21 that is shown as spaced from and secured to the cover 7, as by bolts 22. If desired, the space between the shell and cover may be filled with suitable heat insulating material. At its rear end, the compartment 20 communicates with the interior of the furnace through the top portion of the ash-pit door opening 3.

The upper end of the passageway 18 is surrounded by a metal frame 23. A bead 24 extends about the upper side of this frame and is spaced a suitable distance from the edge thereof, and adapted to rest upon the frame, inwardly of the bead 24, is a damper 25. This damper is made up of a metal frame 26 that carries a body of refractory material.

Situated within the rear end of the compartment 20, where it may be exposed to the products of combustion escaping through the passageway 18 from the combustion chamber when the damper 25 is open, is a steam generator 28, shown as provided with heat abstracting veins 29. The generator is closed at one end, and at the other is flanged (see Fig. 5) for connection with a float chamber 30 which has a removable cover 31 that is shown as held in place by screws 32 which bind the peripheral flanges of the cover and chamber together. The float chamber has a depending leg 33 and extending upwardly through a hole in the bottom of said leg 30 is the end of a fitting 35 having a base 36 which closes said opening. The fitting 35 has two tubular vertical branches 37 and 38 which open at their upper ends, respectively, through ports 39 and 40 into the float chamber. A water inlet pipe 41 is threaded into one side of the branch 37 and a water outlet pipe 42 is likewise connected to the branch 36. An upwardly seating valve 44 controls the ingress of water through the branch 37 and a downwardly seating valve 45 governs the egress of water through the branch 38. The stem of the former valve is extended upwardly and is provided at its upper end with a head 46 which is slidable within a casing 47 that is carried by the stem 48 of a ball float 49 that occupies the spherical portion of the float chamber. A cap 50 is screwed onto the lower end of the casing 47 and between it and the head 46 is a comparatively light compression spring 51. The upper ends of the stems of the valves 44 and 45 are guided through oppositely extending portions of a bracket 54 which rises from the fitting 35, and to the end of an arm 55 of said bracket is pivotally connected a lever 56. The free end 57 of this lever is forked and loosely embraces the casing 47 and intermediate its ends has a rocking connection with the upper end of the stem of the valve 45. The forked end of the lever 56 is arranged to be engaged by the cap 50.

A supply of water is maintained at a predetermined level within the generator 28 as follows, by the float controlled mechanism just described. Water, entering through the pipe 41, branch 37 and ports 39, rises within the float chamber and generator until the float 49 is elevated thereby sufficiently to seat the valve 44 and thus stop the inflow of water. Should leakage occur about the valve 44 and as a consequence thereof the water level within the generator and float chamber rise above the aforesaid predetermined level, the float will be permitted to respond to this excess rise of water by reason of the yielding connection between it and the stem of the valve 44 afforded by the spring 51, and the float will carry with it the casing 47 which, through the cap 50, will lift the free end of the lever 56 and, through the lever's connection with the stem of the valve 45, lift valve 45 off its seat and allow the excess water to escape through the ports 40, branch 36 and pipe 42.

Stems 60 depend from the valves 44 and 45 and these stems, which are other than circular in cross section (preferably square), extend through openings of corresponding size and shape in plates 61 which are secured within the upper ends of the tubular shanks of keys 62 that are rotatably supported by packing glands 63 within the lower ends of the branches 37 and 38. These keys provide means for rotating the valves 44 and 45 so that the valves and their seats may be kept ground to a proper fit.

The end wall of the steam generator 28, opposite the float chamber 30, is provided adjacent its top with a hollow boss 65, and adjacent its lower edge with a similar boss 66. A nipple 67 is screwed into the boss 65 and at its outer end carries a steam dome 68. Steam is led from the steam dome through pipes 69 and 70 (Fig. 2) and a tube 71 to one section 72 of a multiple oil burner 73. Each section of this burner is constructed, as illustrated in Fig. 8, of a steam nozzle 75 and an oil nozzle 76 which are sustained in proper relation to each other by a frame 77 in which said nozzles are clamped by a head 78 that is held firmly in place by a wing nut 79 threaded on the outer end of a stud 80 that is carried by the frame 77. The steam tube 71 is joined by a union to the upper end of a tubular boss 82 that rises from the frame 77, and the bore of this boss communicates with the duct of the nozzle 75. The middle one of these oil supply pipes designated 134 is connected to a similar boss 83 which depends from the frame 77, and the bore of this boss communicates with the duct of the nozzle 76. This construction provides a simple but highly efficient oil burner of the injector type and one which may be readily dissembled for purposes of inspection and repairs or replacement of parts.

Leading from a T 85 (Fig. 2) which constitutes the terminal of the steam pipe 70 is a branch pipe 86 which connects with the steam chamber 87 of the steam operated valve unit, illustrated in detail in Figs. 9, 10 and 11. This unit consists of a base 90 having an inlet opening 91 to which the aforesaid pipe 86, leads, and outlet ports 92 and 93 which communicate, through the respective tubes 94 and 95, with the sections 96 and 97 of the fuel oil burner 73. The peripheral portion of a plate 98 is clamped between corresponding portions of the base 90 and a frame 99 that are drawn together by means of cap screws 100. Metallic bellows 101 have one of their respective ends attached to the plate 98 about enlarged openings therein, and secured to and closing the opposite ends of the bellows are plates 102 having reentrant portions that extend into the bellows nearly to the ends thereof which connect with the plate 98, the reentrant portions terminating in flat parts 103 which carry valves 104 and 105 that cooperate with seats 106, set within ports 107 and 108 formed in the base 90 and communicating, respectively, with the outlet openings 92 and 93. It is apparent from the foregoing that the valve 104 controls the flow of steam through the tube 94 to the burner section 96, and that the valve 105 controls the flow of steam through the tube 95 to the burner section 97. Each of the valves is urged toward its seat by a compression spring 110 that is confined between the part 103 of the plate 102 and a disk 111 which is sustained by the inner end of an adjusting screw 112 that is threaded through portions of the frame 99 in axial alignment with the corresponding valve. A shell 115 encloses the frame 99 and the bellows 101 and is shown as held in place by a cap screw 116 that is threaded into the central portion of the frame 99.

A branch 120 (Fig. 2) leads from the steam pipe 69 to a steam operated pump 121 which may be of any approved type, the one illustrated being a piston pump, and without going into a detailed description of its construction it may be briefly explained that a rod 122 extends from one end of the piston structure through the adjacent end wall of the pump casing where it is pivotally connected to a lever 123 that is fulcrumed at 124 to a bracket that is carried by the pump casing. Intermediate its ends the lever 123 has connected to it the valve operating rod 125. A pipe 126 leads from an oil supply (not shown) to the inlet side of the pump, and from the outlet side of the pump a pipe 127 leads to an oil receptacle 128 in which a given oil level is maintained by an overflow pipe 129. Incidentally the oil level may be varied by adjusting the overflow pipe 129 within an oil drain pipe 130 which connects with the bottom of the receptacle 128 and returns to the oil supply. An oil pipe 132 leads from the bottom of the receptacle 128 to a manifold 133 which has connection through the tubes 134 with the various sections of the oil burner 73.

A lever 140 (Figs. 3 and 4) has its inner end loosely connected, through a link 141, with the corresponding end of the damper 25. The lever is provided with opposed knife edge bearings 142 which are engaged in V-notches of a support 143. The end of the lever opposite the one connected to the damper is constructed of a pair of rods 144 which are united, through members 145, with the rods 146 that have their inner ends embedded in the casting which constitutes the major portion of the lever. Mounted upon the rods 144 so that it may be set at various positions therealong is a weight mechanism designated generally by the numeral 148 and which I shall presently describe in detail. This weight mechanism is so positioned upon the lever that it will overbalance the damper 25 under normal conditions, the inner end of the damper under such conditions being lifted so as to establish communication between the combustion chamber 16 and the compartment 20 and deflect the products toward the generator 28.

A hood 150 extends over the damper and the adjacent end of the lever 140 to protect the shell 21 from the intense heat of the flame.

Supported, as by a yoke 152, above the fulcrum of the lever with its axis slightly to the rear thereof is a metallic bellows 153. Confined between opposed depressed bearings 154 and 155 that are carried, respectively, by the bellows and the lever 140 is a thrust pin 156. Communication between the water compartment of the steam generator 28 and the bellows 153 is established through a pipe 157.

Returning now to the weight mechanism 148, illustrated in detail in Figs. 12 to 20, the same is composed of a housing 160 to the opposite sides of the lower end of which are secured bearings 161 that are slidably engaged on the rods 144. The weight mechanism may be adjusted along the rods to the required position wherein it may be held against accidental displacement by a set screw 162 that is threaded through one of the bearings 161. Contained within the upper portion of the housing 160, and covered by a lid 163 that is held in place by screws 164, are solenoids 165 and 166. The fixed portions 167 of the cores of the solenoids are secured to the cover 163 by screws 168. The movable cores of the respective solenoids 165 and 166 are designated 165$^a$ and 166$^a$. The lower ends of these movable cores are equipped with studs to which are pivotally connected links 170. These links are similarly connected at their lower ends to offset portions of pawls 171 that are fulcrumed on pins 172 carried by what I shall term pawl carrying plates 173. These plates are journaled upon a shaft 174 that has bearing in a cross frame 175 sustained by and between the opposed lower portions of the housing 160. The pawl carrying plates 173 may swing about the axis of the shaft 174, and they are provided with lugs 176 through which adjusting screws 177 are threaded for engagement with the adjacent walls of the lower portion of the housing 160. Stops 178 on the pawl carrying plates 173 limit the drop of the pawls and consequently the descent of the movable cores 165$^a$ and 166$^a$ of the solenoids. When either of the solenoids is energized, the initial movement of its core will swing the corresponding pawl 171 on its pivot to engage its nose 171$^a$ with one of the teeth of a gear 179 that is fixed to the shaft 174; and continued upward movement of the solenoid core will, through the intervention of the pawl, swing the corresponding pawl carrying plate 173 upon the shaft 174 and, through the pawl 171, turn the gear and the shaft in a direction depending upon which one of the solenoids is acting. To prevent the pawls from jamming with the gear teeth, stops 180 are carried by the pawl carrying plates to limit the upward pivotal movement of the pawls. Beyond the side of the frame 175 opposite that on which the above described mechanism is located, the shaft 174 is equipped with a worm 181 that meshes with worm wheels 182 that are fastened to vertical shafts 183. These shafts are countersunk at their ends and bear upon pointed studs 184 that are threaded through top and bottom rails 185 of the frame 175, this manner of supporting the shafts insuring freedom of rotation. Fixed to the lower end of each shaft is an arm 186 which carries at its outer end a weight 187. As the shaft 174 is rotated in the manner above described it will, through the worm 181, worm wheels 182 and shafts 183, swing the weights 187 through an arcuate course indicated by the dot-and-dash line $a$ in Fig. 14. In order that the weights may be adjusted independently of the solenoids, the shaft 174 is extended forwardly and equipped with a hand wheel 188.

The wiring diagram of an electric circuit through which the solenoids 165 and 166 are controlled, is shown in Fig. 21. A source of electric energy is represented by a battery 190 and a conductor 191 leads from one side of the battery to a stationary contact 192 that is adapted to be engaged by a contact 193 shown as supported by the piston rod extension 123 of the oil pump 121. As a consequence of this, the contacts 192 and 193 are engaged at each stroke of the pump. Any suitable means may be substituted for that just described which will effect intermittent and momentary closing of the circuit, as, for example, a time operated switch actuated and controlled by clock work mechanism. The pump structure wherewith the contact 193 has electrical as well as mechanical connection is grounded through a conductor 194. The opposite side of the battery 190 is connected through a conductor 195 with the element 196 of a thermostat that is shown conventially at 197. The element 196 swings in opposite directions, in response to the rise and fall of the temperature and engages adjustable contact points 198 and 199 that are carried by a plate 200 that is pivoted at 201 to a base 202. The lower end of the plate 200 is shown as provided with a pointer 203 which cooperates with a scale 204 on the base to enable the thermostat to be set to effect and maintain various temperatures represented by the scale. A conductor 205 leads from the contact point 198 to the winding of the solenoid 165, and a conductor 206 leads from contact point 199 to the winding of the solenoid 166. The two solenoids are grounded through a branched conductor 207.

In considering the operation of the apparatus it will be assumed that oil is present in the receptacle 128 to the level of the upper end of the overflow 129 which brings the oil level within the nozzles 76 of the burner 73 the desired distance below the discharge ends of the nozzles; that water is present in the generator to the level maintained by the float 40; and that the weight mechanism 148 is positioned upon the outer end of the lever 140 so as to overbalance and thus open the damper 25. The door 13 is raised, oil is introduced through the spout 9 into the pan of the preheating burner 8 and the same is ignited by match, taper or the like through the opening 12. The flame from this preheating burner rises through the passageway 18 and heats the generator 28 thereby generating steam which is conducted through the pipe 70 and tube 71 to the middle section 72 of the burner. As the steam issues from the nozzle 75 it sucks oil from the nozzle 76 and atomizes it whereupon the oil and steam mixture, mingled with air supplied through the burner opening of the combustion chamber, ignite from the preheating burner and a part of the flame passes up through the passageway 18 to continue heating the generator 28, while the remainder of the flame passes rearwardly through the combustion chamber 16 into the fire box 17 of the furnace 4.

The steam pressure within the generator is communicated through the pipe 157 to the bellows 153 and when the pressure rises sufficiently it will expand the bellows and depress the rear end of the lever 140 in opposition to the weight mechanism 148, thus closing the damper 25 which will shield the generator 28 from the heat of the flame. As a consequence of this the steam pressure within the generator will fall, the bellows 153 will relax, and the weight mechanism 148 will lift the damper 25. As a matter of fact, in practice, the damper ordinarily swings through a limited range of movement, seldom completely closing.

It will be understood that the thermostat 197 is situated in a room or apartment that is to be kept at a substantially uniform temperature. When the temperature drops sufficiently to cause the thermostatic element 196 to swing to the left and engage the contact point 198, a circuit will be established (each time the contacts 192 and 193 are brought together by the action of the pump) through conductor 191, contacts 192 and 193, the pump structure, the ground wires 194 and 207, the winding of the solenoid 165, conductor 205, contact point 198, thermostatic element 196 and conductor 195. At each impulse of the current and the consequential energization of the solenoid 165, the corresponding pawl carrying plate 173, with its pawl 171, will be elevated to rotate the gear 179 and the shaft 174, and, through the connections previously described, swing the weights 187 outwardly. This has the effect of shifting the center of gravity of the weight mechanism further from the fulcrum of the lever 140, thereby requiring greater steam pressure, acting through the bellows 153, to depress the damper 125. This higher steam pressure within the generator causes a greater amount of fuel oil to be discharged from the burner and as a result the fire enlarges and the heat increases. The intermittent outward shifting of the weights 187 will continue until sufficient heat is created by the apparatus to raise the temperature in the room or apartment wherein the thermostat is located to cause the thermostatic element to withdraw from the contact point 198, and the apparatus will then continue to function under the present adjustment of the weight mechanism until contact is again made between the thermostatic element 196 and one of the other contact points 198 and 199. If the outside or atmospheric temperature continues to fall and causes a like change in the temperature of the room or apartment, contact will again be made between the thermostatic element and the contact point 198. On the other hand, if the outside or atmospheric temperature rises, so that the heat from the furnace causes a marked rise in the temperature of the room, the thermostat 196 will swing in the opposite direction and engage the contact point 199, whereupon the previously described circuit will be established excepting it will be made through the branch conductor 206 instead of the one designated 205, thereby causing solenoid 166 to be energized and, through the mechanism connected with its movable core 166ª, rotate the shaft 174 in the reverse direction and swing the weights 187 inwardly.

Now let it be supposed that the outside or atmospheric temperature falls to such a degree that the one section 72 of the burner is insufficient to create enough fire to properly heat the room or apartment, then the thermostatic element 196 will remain in engagement with the contact point 198 until the steam pressure within the generator 28 rises to such a point that it will, through the automatic valve mechanism illustrated in detail in Figs. 9 to 11, and to which steam pressure from the generator is communicated through the pipes 70 and 86, lift the valve 104 from its seat, permitting steam to pass through the tube 94 to the burner section 96, it being understood that the springs 110 are adjusted to different pressures so that the valves 104 and 105 will be opened in sequence as the steam pressure rises. The apparatus will operate on the two sections of the burner 72 and 96 until the outside or atmospheric temperature further changes to an appreciable extent. If it rises, the valve 104 will resume its seat and the burner section 96 will be shut off. On the other hand, if it continues to fall to a material extent, the steam pressure in the generator will continue to rise in view of the conditions maintained by the thermostat and will lift the valve 105 from its seat, whereupon steam will be delivered to the burner section 97 to throw it into operation.

It will be seen from the foregoing that each burner section is automatically controlled throughout its entire range of operation, and that an additional section is not thrown into action until the preceding section has attained its full capacity.

A modification of the invention is illustrated in Fig. 22 where a fuel oil burner 210 is shown as supported in operative relation to a furnace 211. The burner in this instance is composed of sections 212 and 213, and oil is conducted to said sections through pipes 215 from a suitable source (not shown).

A steam generator 216 is sustained by a suitable support 217 above an oil burner 218 of a well known type, the same being of the class in which wicks are employed, and the wick is adapted to be raised and lowered by means of a spindle 219 that is equipped at its outer end with a handle 220. Carried by the support 217 is mechanism designated 221 which is substantially identical with the weight mechanism 148 of the previously described form of the invention, and on the inner end of what corresponds to the shaft 174 of the former weight mechanism is a yoke 222 which has driving connection with the hand wheel 220, such connection being somewhat in the nature of a universal joint, this form of connection being a well known mechanical expedient. Two solenoids are incorporated in the mechanism 221 and their windings are connected through the branch conduits 225 with the opposed contact points 226 of the thermostat 227. The thermostatic element 228 is connected through a conductor 229 with one side of a source of electrical energy, represented as a battery 230. The other side of the circuit is represented by a conductor 231, and included therein is a time operated switch 232.

Steam is conducted from the generator 216 through a pipe 235 to the burner section 212, and the other section of the burner is adapted to be supplied with steam through a pipe 236. A steam operated valve mechanism 237, similar to that illustrated in Figs. 9 and 1, controls the passage of steam to the burner section 213.

In this case the steam pressure is governed solely by the condition of the burner 218, and the burner, in turn, is controlled by the thermostat through the wick adjusting mechanism 221. When the heat created by the burner 210 is such as will cause the temperature affecting the thermostat 227 to rise above a predetermined point, the wick of the burner 218 will be automatically turned down thereby to lower the steam pressure in the generator 216 and thus reduce the fire. Reversely, when the temperature falls, the thermostat will close the branch of the circuit which causes the mechanism 221 to elevate the wick of the burner thereby to raise the steam pressure within the generator and increase the fire. In the event that the outside or atmospheric temperature is such as will cause the thermostat 227 to be maintained in this later described condition for a considerable length of time, sufficient steam pressure will be generated to operate the mechanism 237 and open the pipe 236 which leads to the section 213 of the burner.

By means of the hand wheel 188, the weight mechanism 148 may be manually adjusted to effect a more rapid increase or decrease of heat than can be accomplished through the thermostatically controlled mechanism. Obviously this is desirable under certain circumstances. The same result may be obtained in the modified form of the invention shown in Fig. 22 by turning the wick up and down by means of a hand wheel 238 on the outer end of the shaft of mechanism 221.

There is a marked advantage in using a shiftable weight or its equivalent together with the steam operated valve for effecting the throwing in of an auxiliary burner over the employment of a manually controlled valve for accomplishing the same purpose as by opening the steam line from the generator to the burner. This will become very evident upon reflection. Suppose steam pressure of a given value prevailed in the generator—ample for one burner—and that a drop in temperature made it desirable to throw in an extra burner, and a valve were immediately opened in a steam line leading from the generator to the second burner. This might so reduce the steam pressure that neither burner would function properly and with a possibility of both burners actually going out. By shifting a weight or the like, the steam pressure is caused to build up until it has reached a head sufficient to operate a second burner at which time it will actuate the steam operated valve mechanism thereby to throw in the second burner.

Having thus described my invention, what I claim is:—

1. In a heating system, the combination of a burner of the injector type, a steam generator exposed to a source of heat, a conduit leading from the steam generator to the burner, means for conducting liquid fuel to the burner, means for varying the amount of heat delivered to the generator thereby to control the steam pressure delivered to the burner, means operated by the steam pressure for actuating the last mentioned means, an adjustment whereby the steam pressure required to actuate said last mentioned means may be varied, and themostatically controlled mechanism for automatically changing said adjustment.

2. In a heating system, the combination of a burner of the injector type, a steam generator, means for delivering a part of the heat from the burner flame to the generator, a conduit leading from the steam generator to the burner, means for conducting liquid fuel to the burner, means for varying the amount of that part of the heat delivered to the generator thereby to control the steam pressure delivered to the burner, a steam operated device in communication with the generator for governing said means and causing it to reduce said amount as the steam pressure rises above a predetermined value, and thermostatically controlled mechanism for governing the action of said device.

3. In a heating system, the combination of a burner of the injector type, a steam generator arranged to receive heat from the burner flame, a conduit leading from the steam generator to the burner, means conducting fuel oil to the burner, a damper intercepting the passage of heat from the flame to the generator, a steam pressure operated device communicating with the steam generator for moving the damper in a direction to reduce the amount of heat delivered to the generator as the steam pressure within the generator rises above a predetermined value, and thermostatically controlled mechanism for resisting the action of said device.

4. In a heating system, the combination of a burner of the injector type, a steam generator arranged to receive heat from the burner flame, a conduit leading from the steam generator to the burner, means for conducting liquid fuel to the burner, a damper intercepting the passage of heat from the flame to the generator, a weight tending to move said damper to ineffective position, a steam pressure operated device communicating with the generator and serving to move the damper to effective position as the steam pressure rises above a predetermined value, and thermostatically controlled mechanism for shifting the center of gravity of the weight.

5. In a heating system, the combination of a burner of the injector type, a steam generator arranged to receive heat from the burner flame, an unobstructed conduit leading from the steam generator to the burner for delivering steam to the burner in quantity proportional to the steam pressure in the generator, means for conducting liquid fuel to the burner, a damper intercepting the passage of heat from the flame to the generator, a weight tending to move said damper to ineffective position, a steam pressure operated device in constant communication with the generator and subject to the variable steam pressure therein for moving the damper to effective position as the steam pressure rises above a predetermined value, and means for shifting the center of gravity of the weight.

6. In a heating system, the combination of a burner of the injector type, a steam generator arranged to receive heat from the burner flame, a conduit leading from the steam generator to the burner, means for conducting fuel oil to the burner, a damper arranged to intercept the passage of heat from the flame to the generator, and a thermostatically governed steam pressure actuated means for operating the damper, said means having communication with the generator.

7. In a heating system, the combination of a plurality of burners of the injector type, a steam generator exposed to a source of heat, means establishing communication between the steam generator and the burners, steam pressure operated means communicating with the generator and acting to throw said burners into operation successively as the steam pressure within the generator increases, and thermostatically controlled mechanism for governing the steam pressure.

8. In a heating system, the combination of a plurality of burners of the injector type, a steam generator arranged to receive heat from the flame or flames thereof, means establishing communication between said steam generator and said burners, a steam pressure operated device communicating with the generator for throwing said burners into operation successively as the steam pressure within the generator increases, a damper arranged to intercept the passage of heat to the generator, and thermostatically controlled steam pressure operated means communicating with the steam generator and acting to move the damper in a direction to intercept the passage of heat to the generator as the pressure within the generator rises.

9. In a heating system, the combination of a heating device comprising a plurality of individual operative sections, and thermostatically controlled means for governing the operation of each of said sections throughout its range of operation from low to high heat and the throwing into operation of another of said sections as the preceding section acquires its maximum heating capacity.

10. In a heating system, the combination of a plurality of liquid fuel burners, and a thermostatically controlled means for causing said burners to be thrown into operation successively and for governing the operation of said burners throughout their range of operation from low to high heat, said means causing an additional one of said burners to be thrown into operation, when the preceding burner has acquired substantially its maximum heating capacity.

11. In a heating system, the combination of a plurality of atomizing liquid fuel burners, a steam generator common to all of said burners and from which the burners receive their steam supply, means for controlling the steam pressure in the generator, means conducting liquid fuel to the burners, valves controlling the flow of steam to the burners, and means communicating with said generator for opening the valves successively when the pressure within the generator reaches predetermined values.

12. In a heating system, the combination of a burner of the injector type, a steam generator exposed to a source of heat, a conduit through which steam is led from the generator to the burner, means for delivering fuel oil to the burner, a movable element for controlling the amount of heat delivered to the generator, electromagnetic means governing the movement of said element, an electric circuit including said means, a thermostatic switch in said circuit, said switch being maintained closed during the prevalence of a certain temperature condition, and mechanism operating to intermittently close the circuit momentarily, whereby said element will be moved only a comparatively short distance each time said mechanism operates and then only when the thermostatic switch is closed.

13. In a heating system, the combination of a burner of the injector type, a steam generator arranged to receive a part of the heat from said burner, means for varying the amount of heat delivered to the generator, a steam operated device in communication with the steam generator for operating the last mentioned means and acting to reduce the amount of heat delivered to the generator as the steam pressure within the generator rises above a predetermined value, an adjustable weight acting in opposition to the steam operated device, manual means for adjusting the weight, and thermostatically controlled mechanism for shifting the weight.

14. In combination, a main burner and an auxiliary burner, both of the injector type, a steam generator exposed to a source of heat, a conduit leading from the steam generator to each of the burners, means for conducting fuel oil to the burners, means for varying the amount of heat delivered to the generator thereby to control the steam pressure delivered to the burners, means operated by the steam pressure for actuating the last mentioned means, an adjustment whereby the steam pressure required to actuate said last mentioned means may be varied, a valve in the conduit leading to the auxiliary burner, and steam operated means communicating with the generator for opening said valve when the steam pressure has acquired a predetermined value.

15. In combination, a series of burners of the injector type, a steam generator exposed to a source of heat, a conduit leading from the steam generator to each of the burners, means for varying the amount of heat delivered to the generator thereby to control the steam pressure delivered to the burners, means operated by the steam pressure for actuating the last mentioned means, an adjustment whereby the steam pressure required to actuate said last mentioned means may be varied, valves in certain of said conduits, and steam operated means communicating with the generator for opening said valves when the pressure within the generator reaches predetermined values, the steam pressure required to open said valves varying with respect to different ones of the valves.

16. In combination, a main burner and an auxiliary burner, both burners being of the injector type, a steam generator exposed to the products of combustion from said burners, a conduit leading from the steam generator to each of the burners, means for conducting fuel oil to the burners, a damper for shielding the generator from the products of combustion and movable toward and from shielding position, steam operated means communicating with the generator for moving the damper to shielding position, means opposing the action of the last mentioned means and which is adjustable to vary the steam pressure required to move the damper as aforesaid, a valve in the conduit leading to the auxiliary burner, and steam operated means communicating with the generator for opening said valve when the pressure within the generator has acquired a predetermined value.

17. In combination, a main burner and an auxiliary burner, both burners being of the injector type, a steam generator exposed to the products of combustion from said burners, a conduit leading from the steam generator to each of the burners, means for conducting fuel oil to the burners, a damper for shielding the generator from the products of combustion and movable toward and from shielding position, a weight counterbalancing the damper and tending to move it from shielding position, steam operated means communicating with the generator for moving the damper to shielding position, means for shifting the center of gravity of the aforesaid weight thereby to vary the steam pressure required to move the damper as aforesaid, a valve in the conduit leading to the auxiliary burner, and steam operated means communicating with the generator for opening said valve when the pressure within the generator has acquired a predetermined value.

18. In apparatus of the character set forth, the combination of a casing, a combustion chamber housed within the lower portion of the casing and separated from the upper portion thereof by a roof having a passageway, a steam generator supported within the casing in a position to receive products of combustion through said passageway, a damper disposed across said passageway, a lever pivotally supported adjacent the front of the casing and having its inner end connected to the damper, a weight carried by the outer end of the lever and tending to rock the lever in a direction to open the damper, steam operated means communicating with the generator for depressing the inner end of the lever to thus close the damper, a burner of the injector type arranged to discharge its products of combustion into the aforesaid combustion chamber, a conduit through which steam is conducted from the generator to the burner, and means for supplying fuel oil to the burner.

19. In apparatus of the character set forth, the combination of a casing, a combustion chamber housed within the lower portion of the casing and separated from the upper portion thereof by a roof that is provided with a passageway, a steam generator supported within the upper portion of the casing in a position to receive products of combustion through said passageway, a damper disposed across said passageway, a lever pivotally supported adjacent the front of the casing and having its inner end connected to the damper, a weight carried by the outer end of the lever and tending to rock the lever in a direction to open the damper, steam operated means communicating with the generator for depressing the inner ends of the lever to thus close the damper, means for shifting the center of gravity of the weight thereby to vary the steam pressure required to close the damper, a burner of the injector type arranged to discharge its products of combustion into the aforesaid combustion chamber, a conduit through which steam is conducted from the generator to the burner, and means for supplying fuel oil to the burner.

20. In apparatus of the character set forth, the combination of a casing, a combustion chamber housed within the lower portion of the casing and separated from the upper portion thereof by a roof having a passageway, a steam generator supported within the upper portion of the casing in a position to receive products of combustion through said passageway, a damper disposed across said passageway, a lever pivotally supported adjacent the front of the casing and having its inner end connected to the damper, a weight carried by the outer end of the lever and tending to rock the lever in a direction to open the damper, steam operated means communicating with the generator for depressing the inner end of the lever to thus close the damper, a burner of the injector type arranged to discharge its products of combustion into the aforesaid combustion chamber, a conduit through which steam is conducted from the generator to the burner, means for supplying fuel oil to the burner.

21. In apparatus of the character set forth, the combination of a casing, a combustion chamber housed within the lower portion of the casing and separated from the upper portion thereof by a roof having a passageway, a steam generator supported within the upper portion of the casing in a position to receive products of combustion through said passageway, a damper disposed across said passageway, a lever pivotally supported adjacent the front of the casing and having its inner end connected to the damper, a weight carried by the outer end of the lever and tending to rock the lever in a direction to open the damper, steam operated means communicating with the generator for depressing the inner end of the lever to thus close the damper, a burner of the injector type arranged to discharge its products of combustion into the aforesaid combustion chamber, a conduit through which steam is conducted from the generator to the burner, means for supplying the burner with fuel oil, and means for maintaining a substantially constant water level in the generator.

22. In apparatus of the character set forth, the combination of a casing, a lining of refractory material enclosing a combustion chamber within the lower portion of said casing, the roof of said combustion chamber having a passageway, a damper resting upon the roof over said passageway, a steam generator within the upper portion of the casing and arranged to receive products of combustion through said passageway when the damper is lifted, a lever pivotally supported adjacent the front of the casing and extending rearwardly over the damper, the inner end of said lever being connected to said damper, a bellows, connections between said bellows and said lever, a conduit leading from the generator to the bellows, the bellows, when expanded under steam pressure, acting to swing the lever in a direction to close the damper, means tending to swing the lever in a direction to open the damper, a burner of the injector type arranged to discharge its products into the combustion chamber, a conduit leading from the generator to the burner, and means for supplying fuel oil to the burner.

23. In apparatus of the character set forth, the combination of a casing, a lining of refactory material enclosing a combustion chamber within the lower portion of said casing, the roof of said combustion chamber having a passageway, a damper resting upon the roof over said passageway, a steam generator within the upper portion of the casing and arranged to receive products of combustion through said passageway when the damper is lifted, a lever pivotally supported adjacent the front of the casing and extending rearwardly over the damper, the inner end of said lever being connected to the damper, a weight carried by the forward end of the lever and tending to rock the lever in a direction to lift the damper, a bellows supported within the casing above the lever, connections between said bellows and said lever inwardly of the pivot of the lever, a conduit leading from the generator to the bellows, a burner of the injector type arranged to discharge its products into the combustion chamber, a conduit leading from the generator to the burner, and means for supplying fuel oil to the burner.

24. In apparatus of the character set forth, the combination of a casing, a combustion chamber within the lower portion of the casing, the roof of said combustion chamber having a passageway, a damper disposed across said passageway, a steam generator within the upper portion of the casing and arranged to receive products of combustion through said passageway when the damper is lifted, a lever pivotally supported adjacent the front of the casing and extending rearwardly over the damper, the inner end of said lever being connected to the damper, a weight adjustable along the forward end of the lever and tending to rock the lever in a direction to lift the damper, a bellows, connections between said bellows and said lever, a conduit leading from the generator to the bellows, the bellows, when expanded, acting to depress the lever and thus close the damper, a burner of the injector type arranged to discharge its products into the combustion chamber, a conduit leading from the generator to the burner, and means for supplying fuel oil to the burner.

25. In apparatus of the character set forth, the combination of a casing, a combustion chamber within the lower portion of said casing, the roof of said combustion chamber having a passageway, a damper disposed across said passageway, a steam generator within the upper portion of the casing and arranged to receive products of combustion through said passageway when the damper is lifted, a lever pivotally supported adjacent the front of the casing and extending rearwardly over the damper, the inner end of said lever being connected to the damper, a weight carried by the forward end of the lever and tending to rock the lever in a direction to lift the damper, a bellows, connections between said bellows and said lever, a conduit leading from the generator to the bellows, the bellows, when expanded, acting to depress the lever and thus close the damper, a burner of the injector type arranged to discharge its products into the combustion chamber, a conduit leading from the generator to the burner, means for supplying fuel oil to the burner, and a preheating burner arranged to discharge its products into the combustion chamber.

26. In combination, a main burner and an auxiliary burner, both burners being of the injector type, a steam generator exposed to the products of combustion from said burners, a conduit leading from the steam generator to each of the burners, means for conducting fuel oil to the burners, steam operated means communicating with the generator for throwing the auxiliary burner into operation when the steam pressure exceeds a given value, a damper for shielding the generator from the products of combustion and movable toward and from shielding position, steam operated means communicating with the generator for moving the damper to shielding position, and a weight tending to move the damper from shielding position, said weight being changeable whereby its moving influence on the damper may be varied.

27. In a heating system, the combination of a burner of the injector type, means conducting fuel oil thereto, a steam generator from which the burner receives its steam supply, means for delivering a part of the heat from the burner flame to the generator, said means being subjected to the steam pressure in the generator and operable to decrease the amount of heat delivered to the generator as the steam pressure rises, and vice versa, variable power means resisting the actuation of the second mentioned means by the steam pressure, and thermostatic means acting to change the power of the variable power means.

In testimony whereof, I hereunto affix my signature.

MARC RESEK.